FRANKLIN B. COLTON.

Improvement in Dumping Bucket.

No. 122,227.

Patented Dec. 26, 1871.

UNITED STATES PATENT OFFICE.

FRANKLIN B. COLTON, OF PHILADELPHIA, PENNSYLVANIA.

IMPROVEMENT IN DUMPING-BUCKETS.

Specification forming part of Letters Patent No. 122,227, dated December 26, 1871.

Specification describing an Improved Dumping-Bucket, invented by FRANKLIN B. COLTON, of Philadelphia, Pennsylvania.

My invention consists of a bucket composed of two sections adapted to each other and hung to a bale, substantially in the manner described hereafter, so that it will be self-discharging of its load and self-closing after the load is discharged. My invention further consists of devices, described hereafter, for rendering the sections self-locking, and of a provision for enabling the bucket to be readily moved about from place to place on the ground.

My improved dumping-bucket is especially well adapted to the shipping and unshipping of coal, grain, and other materials.

Figure 1:
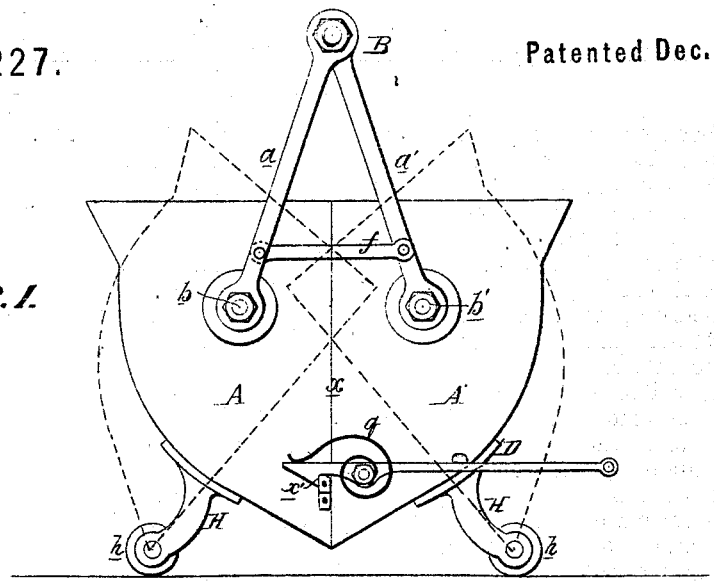
Figure 2:
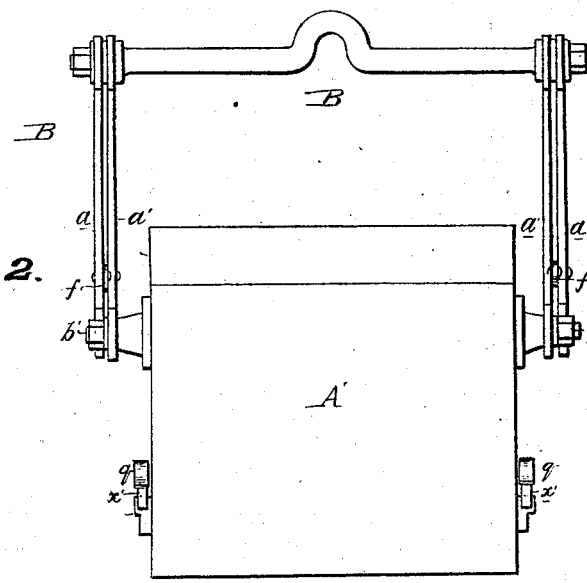

Figure 1 is a side view of my improved dumping-bucket, and Fig. 2 a front view.

The bucket is composed of two sections, A and A', of the form, or approximating to the form, shown in the drawing, the two sections, when closed, meeting at the central line $x$, and being hung to a bale, B, by which the whole can be raised or lowered at pleasure with suitable tackle. The bale consists, in the present instance, of two links, $a$ and $a'$, on each side of the sections, and a cross-bar, by which all the four links are connected together at the top, the pair of links on each side of the sections being connected together by a bar, $f$.

I wish it to be here understood, however, that I do not desire to restrict myself to any specific construction of bale, for different bales may be adopted without departing from the main features of my invention. In all cases, however, the bale should be so constructed as to form bearings for the journals of the sections; these journals $b$ and $b'$ being, in the present instance, adapted to the lower ends of the links $a$ and $a'$.

The journals on each side of the sections should be at equal distances from the central line $x$, where the sections meet, and this distance, as well as that of the journals from the top of the sections, should be such that when the sections are unlocked they will be self-separating and the load discharged, and immediately after the discharge will be self-closing by their own gravity.

The device which I have adopted in the present instance for locking the sections together consists of a lever, D, hung to the section A', and having at one end a catch, $x$, adapted to a projection on the section A, a spring, $q$, tending to depress the catch and retain the sections in a locked condition; and as long as they remain locked the sections form a bucket for containing grain, coal, or other material to be raised or lowered. On depressing the outer end of the lever D, however, the sections will be unlocked, and owing to the weight of the load they will instantly turn in the bale to the position shown by dotted lines and the contents will be discharged. No sooner are the sections emptied, however, than, by their own weight, they will close, and, owing to the inclined end of the catch $x$, will be self-locking.

It will be unnecessary to explain what facilities are afforded by my self-discharging and self-locking bucket for elevating, discharging, unshipping, and shipping coal, grain, and other materials.

In some instances it is necessary to move the bucket about, when it has been lowered to the hold of a vessel for instance, or when it is on the ground prior to receiving its load. When this is required I provide each section with legs H, at the lower ends of which are rollers or casters $h\ h$.

I claim as my invention—

1. The combination, with a hoisting-bale, of a bucket composed of two sections A and A', adapted to each other and hung to the said bale, substantially as described.

2. The combination of the above with the self-locking device described, or its equivalent.

3. The combination of the sections with legs H H and rollers or casters $h\ h$.

In testimony whereof I have signed my name to this specification in the presence of two subscribing witnesses.

FRANKLIN B. COLTON.

Witnesses:
WM. A. STEEL,
HARRY SMITH.